United States Patent [19]

Inoue

[11] 3,897,846

[45] Aug. 5, 1975

[54] STEERING CONTROL SYSTEM FOR A MOTOR VEHICLE

[75] Inventor: Naohiko Inoue, Yokohama, Japan

[73] Assignee: Nissan Motor Company Limited, Yokohama, Japan

[22] Filed: Feb. 28, 1974

[21] Appl. No.: 446,828

[30] Foreign Application Priority Data

Mar. 1, 1973 Japan............................ 48-24489

[52] U.S. Cl....................... 180/79.2 R; 180/79.2 R
[51] Int. Cl............................................. B62d 5/06
[58] Field of Search...................... 180/79.2 R, 79.1

[56] References Cited
UNITED STATES PATENTS 2,957,535   10/1960   Helgeson...................... 180/79.2 R
2,987,135   6/1961    Harvey......................... 180/79.2 R

*Primary Examiner*—David Schonberg
*Assistant Examiner*—John A. Pekar

[57] ABSTRACT

The invention automatically restores to the original direction a motor vehicle's deviated driving direction caused by a lateral disturbance. The lateral velocities at the front and rear of the vehicle are measured by front and rear velocity sensors, respectively. Also measured is the vehicle forward velocity. Electrical signals representing these velocities are fed into an electric computing circuit, from which an electrical signal representing the laterally deviated distance with respect to the original course is supplied to an auxiliary steering control device. Steerable road wheels are thereby controlled through a suitable hydraulic device, automatically correcting the laterally deviated driving direction to the original direction. The system is automatically de-energized in response to the driver's turning of the steering wheel to manually correct the steering direction.

1 Claim, 3 Drawing Figures

STEERING CONTROL SYSTEM FOR A MOTOR VEHICLE

This invention relates to a control system for a motor vehicle for automatically restoring a laterally deviated motor vehicle to an original direction.

With the development of faster cars, there have been increased traffic accidents during high speed driving due to lateral disturbances resulting from a gust of wind, an uneven road surface, etc. This unwanted lateral disturbance comes so suddenly that a driver sometimes can not deal with it, resulting in a collision with another vehicle or running off the road. Heretofore, in order to reduce the bad influences of lateral disturbances, improvements for increasing a vehicle's stability against lateral forces have been made in the suspension and the aerodynamic characteristics of car bodies. However, these improvements adversely affect or do not fit the car design and other various characteristics of motor vehicles. Furthermore, these improvements are not intended to correct a laterally deviated motor vehicle's driving direction, but only to reduce the influence of the lateral disturbance.

According to the present invention, a laterally deviated motor vehicle driving direction is automatically corrected as follows. The lateral velocities at the front and rear ends of the vehicle are measured by front and rear velocity sensors respectively. Also measured is the vehicle forward velocity by a suitable speed measuring device. The measured velocities are supplied to an electric computing circuit from which an electrical signal representing the laterally deviated distance with respect to the original driving course is derived and supplied to an auxiliary steering control device, resulting in controlling steerable vehicle wheels through a suitable hydraulic device and automatically correcting the laterally deviated driving direction to the original direction. The system is automatically de-energized in response to a manual steering demand from the driver.

It is therefore a primary object of the present invention to provide an improved control system for correcting a laterally deviated motor vehicle's driving direction, wherein computed is the laterally deviated distance with respect to the original course, and an electrical signal proportional to the computed value is supplied to an auxiliary steering control device to turn the vehicle wheels to correct the driving direction.

It is an another object of the present invention to provide an improved control system for correcting a laterally deviated motor vehicle's driving direction, wherein a manual steering demand by a driver has precedence over the automatic steering operation, so that the automatic steering operation takes place only if the driver can not deal with the unwanted sudden lateral deviation of the motor vehicle.

Additional objects as well as features and advantages of the invention will become evident from the detailed description set forth hereinafter when considered in conjunction with the accompanying drawings, wherein.

Figure 1:
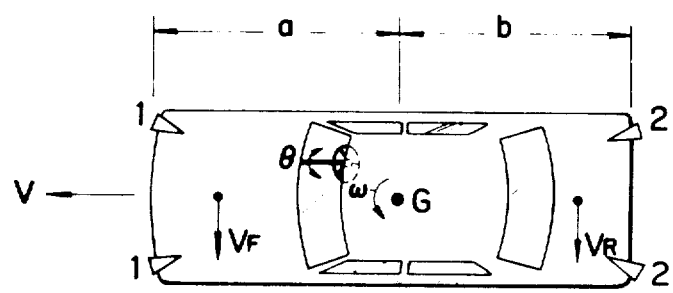
FIG. 1 is a schematic plan view of a motor vehicle having two sets of velocity sensors, useful for describing the present invention.
Figure 2:
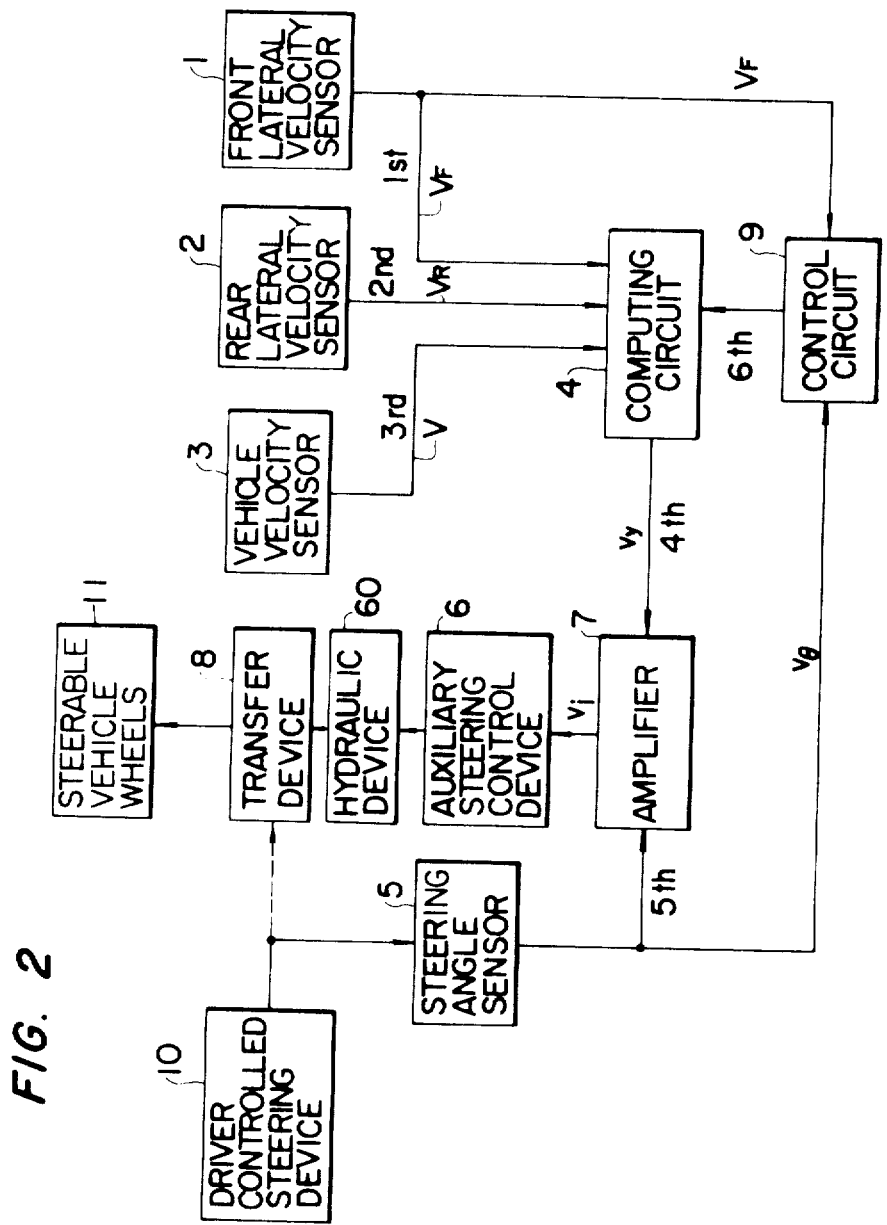
FIG. 2 is a block diagram of an automatic control system in accordance with the present invention.
Figure 3:
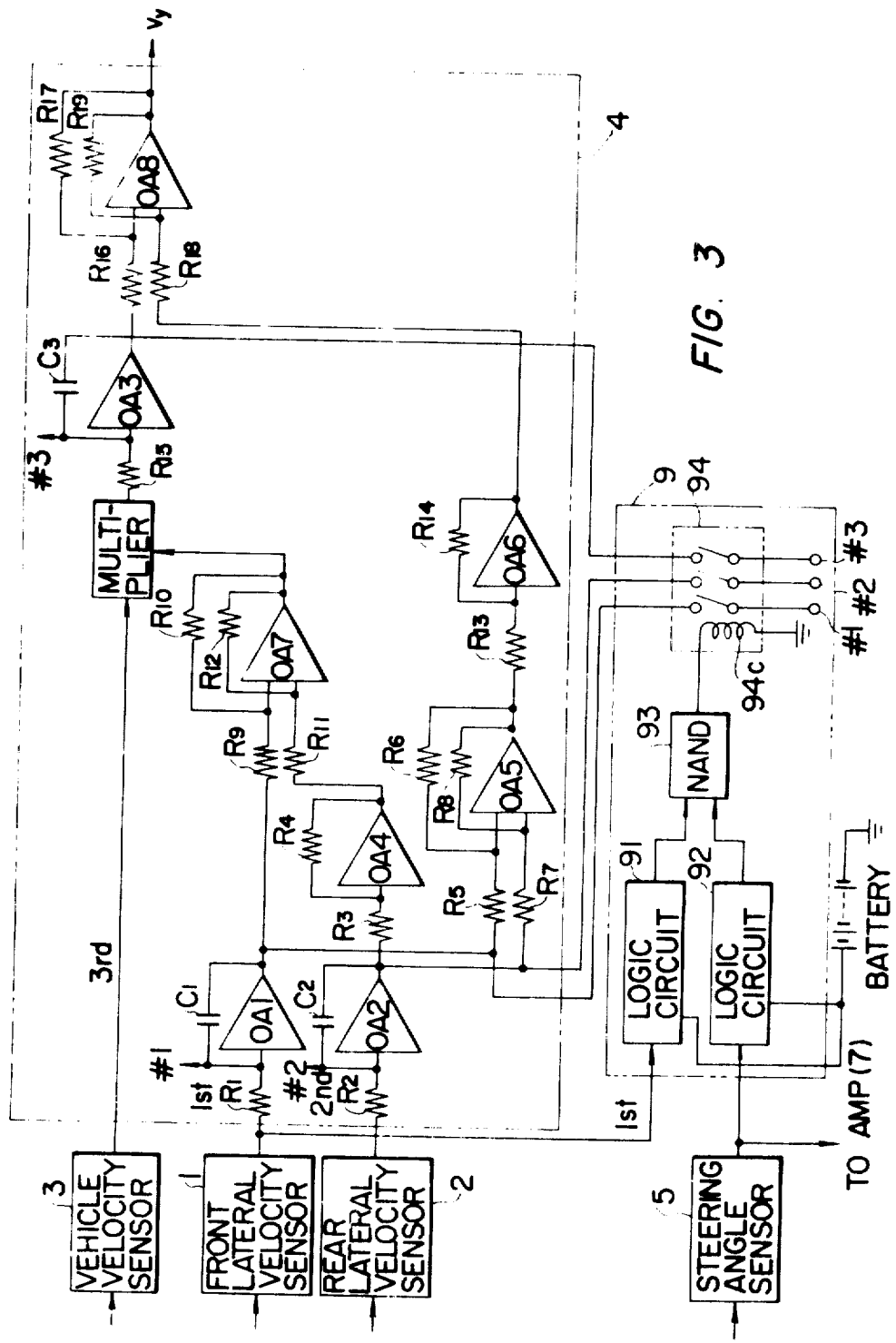
FIG. 3 is a block diagram of a part of FIG. 2 showing an electrical logic circuit of a computing circuit and a control circuit.

Reference is now made to the drawings, wherein there is shown an automatic steering control system in accordance with the present invention to correct automatically a laterally deviated motor vehicle's driving direction. In FIG. 3 there are illustrated schematic circuit diagrams of a computing circuit 4 and a control circuit 9, together with four sensors. A front lateral velocity sensor 1 is installed at the front end of a vehicle as shown in FIG. 1, and the sensor 1 (for example, using the Doppler effect as taught by U.S. Pat. No. 3,735,200 which discloses a wheel slip sensor employing doppler shifts in a pulsed ultrasonic beam) is coupled to a logic circuit 91 of the control circuit 9 and supplies thereto a first electrical signal which represents the lateral velocity of the front end of the vehicle, and the output of the logic circuit 91 is supplied to a NAND logic gate 93. The output signal of the logic circuit 91 is equal to the potential E of a battery (no numeral) when the output of the sensor 1 is larger than a first predetermined value; i.e. the lateral disturbance at the vehicle front is large to the extent that the deviated driving direction must be corrected. The output signal of the logic circuit 91 is zero when the electrical signal from the sensor 1 is smaller than the first predetermined value, or the lateral disturbance at the vehicle front end is negligible. A steering angle sensor 5 is coupled to another logic circuit 92 of the control circuit 9, and supplies thereto a fifth electrical signal which represents the steering angle demanded by the driver. The output of the logic circuit 92 is fed to the NAND logic gate 93. The relationship between the input and output signals of the logic circuit 92 is previously determined in circuit design as follows. When the fifth electrical signal $v_\theta$ is smaller or larger than a second predetermined value $v_{\theta\ 0}$, the output signal is the battery potential E or zero potential, respectively.

As mentioned above, the electrical output signals of the logic circuits 91 and 92 are supplied to the NAND gate 93, the output of which is a sixth electrical signal fed to a relay coil 94c of a relay 94 to control the computing circuit 4. The NAND gate 93 will produce a zero output only when both inputs are E, or when the front lateral velocity is above the first predetermined value and the steering angle $v_\theta$ is simultaneously smaller than the second predetermined value $v_{\theta\ 0}$.

In the control circuit 9, firstly assuming that the steering angle and the lateral velocity of the vehicle front are both smaller than the respective predetermined values, it is clearly understood that the correcting operation is not needed. The output of the logic circuit 91 is zero potential and that of the logic circuit 92 the battery potential E, so that the output of the NAND gate 93 is the potential E. Therefore, current will flow through the relay coil 94c of the relay 94 and cause relay contacts (no numerals) thereof to close to short-circuit feedback capacitors $C_1$, $C_2$ and $C_3$ of the computing circuit 4. This inhibits generation from operational amplifiers OA1, OA2 and OA3 of output voltages which are the definite integrals of their input voltages. Consequently, no electrical signal is supplied to the succeeding element, which is an amplifier 7.

Secondly, in a case where the steering angle is larger than the second predetermined value, it is understood that the output of the NAND gate 93 will be equal to the battery potential E whether the lateral velocity of the vehicle front end is larger than the first predetermined value or not. The relay coil 94c is thus energized and causes the relay contacts to close. Consequently, the capacitors $C_1$, $C_2$ and $C_3$ all are short-circuited, resulting in inhibiting generation of output signals from the computing circuit 4. In this case, in the same manner as the first case, no electrical signal is supplied to the amplifier 7, and as a natural result also not to an auxiliary or second steering control device 6 coupled thereto. However, it is to be noted that the fifth electrical signal which represents the steering angle demanded by the driver is also fed to the auxiliary steering control device 6 through the amplifier 7. Therefore, steering control by the driver has precedence over the automatic steering operation. The automatic steering operation takes place only if the driver can not deal with the unwanted sudden lateral deviation of the motor vehicle.

In the above-mentioned first and second cases, the operational amplifiers OA1, OA2 and OA3 are inhibited so that the output of the computing circuit 4 is zero. Therefore, there is no fear that the circuit 4 will supply the amplifier 7 with an error signal due to a drift voltage which is liable to be generated by a d-c amplifier.

A transfer device 8, which is coupled to a driver-controlled manual steering device 10 such as a steering wheel and also to the auxiliary steering control device 6, transmits steering power from the auxiliary steering control device 6 to steerable vehicle wheels 11 when the steering angle demanded by the driver is smaller than the fifth predetermined value. However, it transmits thereto steering power from the driver-controlled steering device 10 if the steering angle demanded by the driver exceeds the fifth predetermined value or if the present automatic control system is broken.

On the other hand, in the last case where the steering angle is smaller than the fifth predetermined value and simultaneously the forward lateral velocity is higher than the first predetermined value, the output voltage of the NAND gate 93 is zero since both input signals to the NAND gate 93 are the battery potential E. In this instance, the relay 94 remains open because of the absence of current flowing through the relay coil 94c. Therefore, the operational amplifiers OA1, OA2 and OA3 generate output voltages that are the definite integrals of their input voltages, since the capacitors $C_1$, $C_2$ and $C_3$ of the computing circuit 4 are not short-circuited by the relay 94. As seen from the accompanying drawings, three velocity sensors (the vehicle speed sensor 3, the front lateral velocity sensor 1 and the rear lateral velocity sensor 2) are all coupled to and supply a third, the first and a second electrical signal respectively to the computing circuit 4. The rear lateral velocity sensor 2 is installed at the rear end of the car as shown in FIG. 1 and, for example, uses the Doppler effect. In the last case, the computing circuit 4 produces and supplies to the amplifier 7 a fourth electrical signal $v_y$ proportional to the laterally deviated distance on the basis of the three input signals. An output V; proportional to $v_y$ is fed to the control device 6, the output of which is supplied to the steerable wheels 11 through a hydraulic device 60 and the transfer device 8. In this way, the operation of automatically correcting the laterally deviated vehicle's driving direction takes place. The equation illustrated below is used for computing the electrical signal $v_y$ fed from the computing circuit 4 to the amplifier 7. The electric components of the computing circuit 4 are arranged to solve the below equation by an analog computing method.

$$v_y \alpha y = K_1 \int_0^t \frac{aV_R + bV_F}{a+b} dt +$$

$$K_2 \int_0^t \left\{ V - \int_0^t \frac{V_F - V_R}{a+b} dt \right\} dt$$

where
- $v_y$: output voltage of the computing circuit 4
- $y$ : laterally deviated distance of the vehicle due to the lateral disturbance
- $a$ : distance between the front end and the center of gravity of the vehicle
- $b$ : distance between the rear end and the center of gravity of the vehicle
- $V_F$, $V_R$: lateral velocities of the front and the rear portions of the vehicle, respectively
- $V$ : vehicle forward velocity
- $K_1$, $K_2$: constants
- $t$ : time In the present invention, it is understood that on the basis of the front and rear velocities, a yaw rate around the vertical axis at the center of gravity of the car can be computed by adding a suitable yaw computing circuit to the computing circuit 5.

Furthermore, there can be added to the computing circuit 4 a simulating circuit, which simulates the most desirable correcting operation on the basis of the above-mentioned three sensed velocities. The electrical output signal $v_y$ of the computing circuit 4 fed to the amplifier 7 is made as near as possible to the simulated value, so that since the simulated correcting operation is programmed previously, more appropriate correction can be carried out.

It is to be understood that the invention is not limited to the specific embodiment herein illustrated and described, but may be used in other ways without departure from its scope as defined by the following claims.

What is claimed is:

1. An automatic steering control system for automatically restoring to an original direction a laterally deviated motor vehicle, which comprises;

a manual steering control device controlled by a driver and being connected to steerable wheels of the vehicle;

an auxiliary steering control device operably associated with the steerable wheels for automatically controlling the steerable wheels to correct the laterally deviated motor vehicle's direction;

a first velocity sensor being installed at the front end of the motor vehicle and adapted to sense the lateral velocity thereof and being connected to and supplying a first electrical signal to a computing circuit, said first electrical signal representing the lateral velocity of the front end;

a second velocity sensor being installed at the rear end of the motor vehicle and adapted to sense the lateral velocity thereof, and being connected to and supplying a second electrical signal to said computing circuit, said second electrical signal representing the lateral velocity of the rear end;

a third velocity sensor for sensing the motor vehicle's forward velocity being connected to and supplying a third electrical signal to said computing circuit, said third electrical signal representing the forward velocity of the motor vehicle, said computing circuit computing the laterally deviated distance on the basis of said first, second and third electrical signals, and supplying a fourth electrical signal proportional to the computed deviated distance to said auxiliary steering control device;

a control circuit coupled to said computing circuit and controlling the operation thereof, and said first velocity sensor also being connected to and supplying said first electrical signal to said control circuit;

a steering angle sensor for sensing the driver-demanded steering angle being coupled to said control circuit and supplying thereto a fifth electrical signal representing the steering angle; and said control circuit supplying a sixth electrical signal to said computing circuit for enabling computing operation thereof only when said first electrical signal exceeds a first predetermined value and at the same time said fifth electrical signal is smaller than a second predetermined value, said first predetermined value representing the extent of the lateral disturbance at the front end of the motor vehicle which is so large that the deviated driving direction thereof must be corrected, and said second predetermined value representing the small extent of the driver-demanded steering angle which is insufficient to correct the deviated driving direction, whilst said control circuit inhibiting operation of said computing circuit to compute and generate said fourth electrical signal when said fifth electrical signal exceeds said second predetermined value, and also when both of said first and fifth electrical signals are smaller than said first and second predetermined values, respectively.

* * * * *